US006816648B2

(12) United States Patent
Goldstein

(10) Patent No.: US 6,816,648 B2
(45) Date of Patent: Nov. 9, 2004

(54) INTEGRATED WAVEGUIDE GRATINGS BY ION IMPLANTATION

(75) Inventor: Michael Goldstein, Ridgefield, CT (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 10/136,154

(22) Filed: May 1, 2002

(65) Prior Publication Data

US 2003/0206698 A1 Nov. 6, 2003

(51) Int. Cl.[7] .................................................. G02B 6/34
(52) U.S. Cl. .......................... 385/37; 385/14; 385/129; 385/130; 385/131; 65/394; 359/566; 359/569; 359/573; 359/575
(58) Field of Search ................... 385/14, 37, 129–131; 65/394; 359/566, 569, 573, 575

(56) References Cited

U.S. PATENT DOCUMENTS

| | | | |
|---|---|---|---|
| 4,420,873 A | 12/1983 | Leonberger et al. | 29/576 E |
| 4,518,219 A | 5/1985 | Leonberger et al. | 350/96.12 |
| 5,436,991 A | 7/1995 | Sunagawa et al. | 385/37 |
| 5,465,860 A | 11/1995 | Fujimoto et al. | 216/24 |
| 5,540,346 A | 7/1996 | Fujimoto et al. | 216/24 |
| 5,581,639 A | 12/1996 | Davies et al. | 385/10 |
| 5,600,743 A * | 2/1997 | Hillmer | 385/37 |

(List continued on next page.)

FOREIGN PATENT DOCUMENTS

| | | | | |
|---|---|---|---|---|
| EP | 1001286 A1 * | 5/2000 | ........... | G02B/6/124 |
| JP | 59124306 A * | 7/1984 | ........... | G02B/5/174 |
| JP | 05142404 A * | 6/1993 | ........... | G02B/5/18 |

OTHER PUBLICATIONS

Ayazi et al., "High aspect–ratio polysilicon micromachining technology," Sensors and Actuators 87 (2000) 46–51.
Eldada et al., "Thermooptic Planar Polymer Bragg Grating OADM's with Broad Tuning Range," IEEE Photonics Technology Letters, vol. 11, No. 4, Apr. 1999, pp. 448–450.
Itoh et al., "Low–Loss 1.5% Δ Arrayed Waveguide Grating with Spot–Size Converters," NTT Photonics Laboratories, 2 pages.
Mahorowala et al., "In Situ Measurement of RIE Lag During Polysilicon Etching in a Lam TCP using Full Wafer Interferometry," http://www.plasma–processing.com/insitu.htm, 12 pages.
Moerman et al., "A Review on Fabrication Technologies for the Monolithic Integration of Tapers with III–V Semiconductor Devices," IEEE Journal of Selected Topics in Quantum Electronics, vol. 3, No. 6, Dec. 1997, pp. 1308–1320.
Rose et al., "Round Robin for Optical Fiber Bragg Grating Metrology," J. Res. Natl. Inst. Stand. Technol. 105, 839–866 (2000).
Westerheim et al., "Substrate bias effects in high–aspect–ratio $SiO_2$ contact etching using an inductively coupled plasma reactor," J. Vac. Sci. Technol. A 13(3), May/Jun. 1995, pp. 853–858.
Yonemura et al., "Session FT3—Inductively Coupled Plasmas I.," http://www.aps.org/BAPSGEC98/abs/S2000.html, 4 pages.

*Primary Examiner*—Brian Healy
*Assistant Examiner*—Daniel Petkovsek

(57) ABSTRACT

Integrated semiconductor waveguide gratings, methods of manufacture thereof and methods of apodizing thereof are described. A semiconductor waveguide grating includes a substrate, a cladding layer disposed on the substrate, a guide structure that includes a plurality of discrete transverse sections implanted with ions disposed between adjacent transverse sections substantially free of implanted ions.

22 Claims, 6 Drawing Sheets

U.S. PATENT DOCUMENTS

| | | | |
|---|---|---|---|
| 5,745,617 A | 4/1998 | Starodubov et al. | 385/37 |
| 5,805,751 A | 9/1998 | Kewitsch et al. | 385/43 |
| 5,825,047 A | 10/1998 | Ajisawa et al. | 257/12 |
| 5,881,186 A | 3/1999 | Starodubov | 385/37 |
| 5,881,188 A | 3/1999 | Starodubov | 385/37 |
| 5,917,980 A | 6/1999 | Yoshimura et al. | 385/129 |
| 5,943,465 A | 8/1999 | Kawaguchi et al. | 385/122 |
| 5,972,542 A | 10/1999 | Starodubov | 430/5 |
| 6,075,908 A | 6/2000 | Paniccia et al. | 385/14 |
| 6,083,843 A | 7/2000 | Ohja et al. | 438/710 |
| 6,115,518 A * | 9/2000 | Clapp | 385/37 |
| 6,147,366 A | 11/2000 | Drottar et al. | 257/82 |
| 6,166,846 A | 12/2000 | Maloney | 359/247 |
| 6,169,830 B1 | 1/2001 | Kewitsch et al. | 385/37 |
| 6,178,281 B1 | 1/2001 | Sautter et al. | 385/129 |
| 6,195,478 B1 | 2/2001 | Fouquet | 385/17 |
| 6,201,909 B1 | 3/2001 | Kewitsch et al. | 385/37 |
| 6,215,577 B1 | 4/2001 | Koehl et al. | 359/261 |
| 6,236,782 B1 | 5/2001 | Kewitsch et al. | 385/43 |
| 6,243,517 B1 | 6/2001 | Deacon | 385/50 |
| 6,268,953 B1 | 7/2001 | Maloney | 359/321 |
| 6,269,199 B1 | 7/2001 | Maloney | 385/14 |
| 6,289,699 B1 | 9/2001 | Kewitsch et al. | 65/406 |
| 6,304,706 B1 | 10/2001 | Sugita et al. | 385/129 |
| 6,321,011 B2 | 11/2001 | Deacon | 385/50 |
| 6,324,204 B1 | 11/2001 | Deacon | 372/96 |
| 6,393,180 B1 * | 5/2002 | Farries et al. | 385/37 |
| 6,516,117 B1 * | 2/2003 | Fujimaki et al. | 385/37 |
| 6,580,863 B2 * | 6/2003 | Yegnanarayanan et al. | 385/132 |
| 6,649,990 B2 * | 11/2003 | Morse | 257/431 |
| 2002/0150337 A1 * | 10/2002 | Fujimaki | 385/37 |
| 2003/0024274 A1 * | 2/2003 | Cho et al. | 65/386 |

\* cited by examiner

US 6,816,648 B2

INTEGRATED WAVEGUIDE GRATINGS BY ION IMPLANTATION

BACKGROUND

1. Technical Field

Integrated semiconductor waveguide gratings are disclosed that are fabricated using ion implantation. Methods of fabricating integrated semiconductor waveguide gratings are disclosed that use ion implantation to form a refractive index grating along the length of the integrated semiconductor waveguide. Further, methods of apodizing integrated waveguide gratings are also disclosed.

2. Description of the Related Art

There is a wide-ranging demand for increased communications capabilities, including more channels and greater bandwidth per channel. The needs range from long distance applications such as telecommunications between two cities to extremely short range applications such as the data-communications between two functional blocks (fubs) in a semiconductor circuit with spacing of a hundred microns. Optical media, such as optical fibers or waveguides, provide an economical and higher bandwidth alternative to electrical conductors for communications. A typical optical fiber includes a silica core, a silica cladding, and a protective coating. The index of refraction of the core is higher than the index of refraction of the cladding to promote internal reflection of light propagating down the silica core.

Optical fibers can carry information encoded as optical pulses over long distances. The advantages of optical media include vastly increased data rates, lower transmission losses, lower basic cost of materials, smaller cable sizes, and almost complete immunity from stray electrical fields. Other applications for optical fibers include guiding light to awkward places (e.g., surgical applications), image guiding for remote viewing, and various sensing applications.

The use of optical waveguides in circuitry to replace conductors separates path length affects (e.g., delays) from electrical issues such as mutual impedance. As a result, optical interconnects and optical clocks are two applications for waveguide technology.

The signal carrying ability of optical fibers is due in part to the ability to produce long longitudinally-uniform optical fibers. However, longitudinal variations in index of refraction, e.g., those associated with refractive-index gratings, can be included in the optical fibers to affect the transmitted pulses in useful ways. Gratings can be grouped into short-period, e.g., about 0.5 micron ($\mu$m), or long-period, e.g., about 200 $\mu$m, gratings. Short-period gratings can reflect incident light of a particular wavelength back on itself in the fiber. Short-period gratings are also called Fiber Bragg Gratings. Long-period gratings can couple incident light of a particular wavelength into other co-propagating modes of the fiber or selectively block certain wavelengths from propagating efficiently through the fiber.

Apodized Fiber Bragg Gratings are commonly used in wavelength division multiplexing optical networks while waveguides and photonic band gap crystal structures are used in integrated optical-electronic devices without apodization. Apodization can be utilized in Fiber Bragg Gratings to either attenuate light of certain wavelengths or narrow the bandwidth passing through the grating by either absorption or reflection of light at undesired wavelengths. Fiber Bragg Gratings are apodized using hydrogen loading systems or ultraviolet light sources to modify the refractive index along the length of the grating. One advantage of Fiber Bragg Gratings is that they are made within the fiber itself which minimizes insertion loss, simplifies manufacture and eliminates the need for complex and precise alignment. However, because Fiber Bragg Gratings are created within the fiber itself, the applications are limited and therefore cannot be used in coupling systems, routing systems or opto-electronic devices. The use of ultraviolet UV light for bleaching purposes in a refractive index grating requires a guide medium that does not unacceptably absorb the UV light.

Photonic band gap crystal structures are engineered with uniform or periodic changes in their dielectric constant, analogous to the crystal structure of semiconductors, which creates a band gap for photons or a range of frequencies where electromatic waves cannot exist within the material. As a result, photonic band gap crystal structures allow control of the frequencies and directions of the propagating light. Unfortunately, apodization is not currently possible with uniform photonic band gap crystal structures. More importantly, because integrated waveguides and photonic crystals are often fabricated in semiconductors that absorb ultraviolet light, bleaching is not a practical means for generating index of refraction changes.

Thus, there is a need for gratings that can be employed in optical-electronic devices, like the photonic band gap crystal structures, but which can be apodized, if desirable, like a Fiber Bragg Grating.

It should be understood that the drawings are necessarily to scale and that embodiments are illustrated by diagrammatic representations, fragmentary views and graphical presentations. In certain instances, details which are not necessary for an understanding of the disclosed methods and gratings or render other details difficult to perceive may have been omitted. It should be understood, of course, that this disclosure is not necessarily limited to the particular embodiments illustrated herein.

DETAILED DESCRIPTION OF THE PRESENTLY PREFERRED EMBODIMENTS

Figure 1:
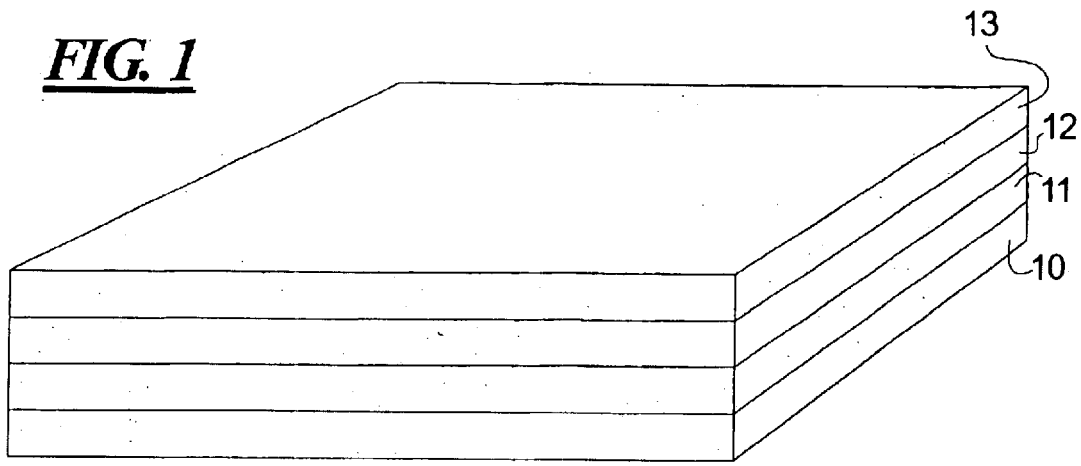
FIG. 1 is a perspective view of a substrate, lower cladding layer, a guide layer and a mask layer used in the fabrication of a disclosed integrated semiconductor waveguide grating.
Figure 2:
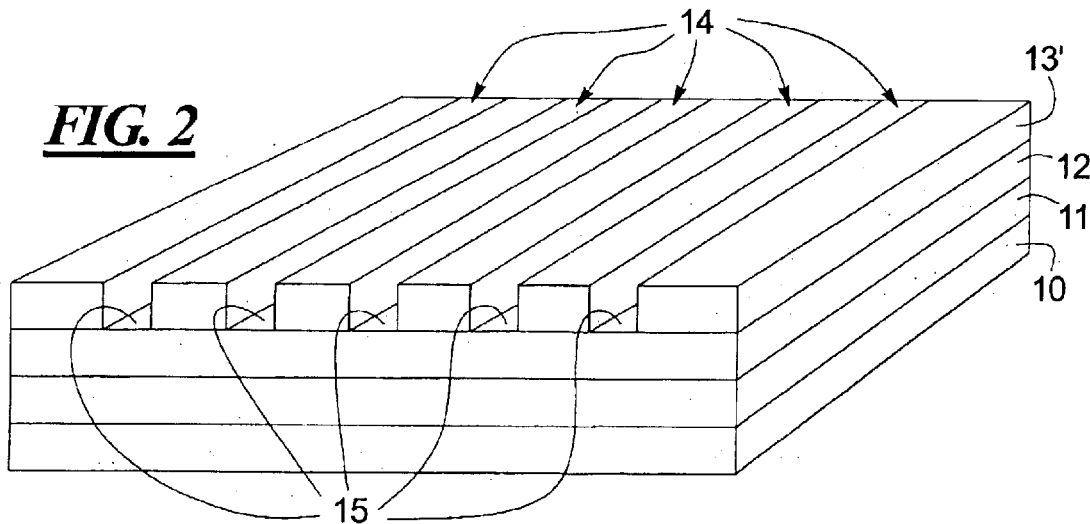
FIG. 2 is a perspective view of the structure shown in FIG. 1 after grooves have been formed in the mask layer by patterning and etching to expose transverse sections of the guide layer disposed therebelow.

FIGS. 1–5 illustrate a novel method for fabricating an integrated semiconductor waveguide grating. Referring to FIG. 1, a lower cladding 11 is deposited on a substrate 10. A guide layer 12 is deposited on the lower cladding 11 and a mask layer 13 is deposited on the guide layer 12. Turning to FIG. 2, the mask layer 13 is patterned and etched to create a series of periodic structures, or transverse grooves shown generally at 14. The patterning is preferably carried out using a lithographic process although other patterning processes such as ablation, ruling, or other techniques will be apparent to those skilled in the art. The etching can be carried out using either a dry or a wet process, and varieties of both wet and dry etching will be apparent to those skilled in the art and will be dependent upon the material used for the guide and masking layers. Also as shown in FIG. 2, discrete transverse sections 15 of the guide layer 12 are exposed by the patterned mask layer 13.

Figure 3:
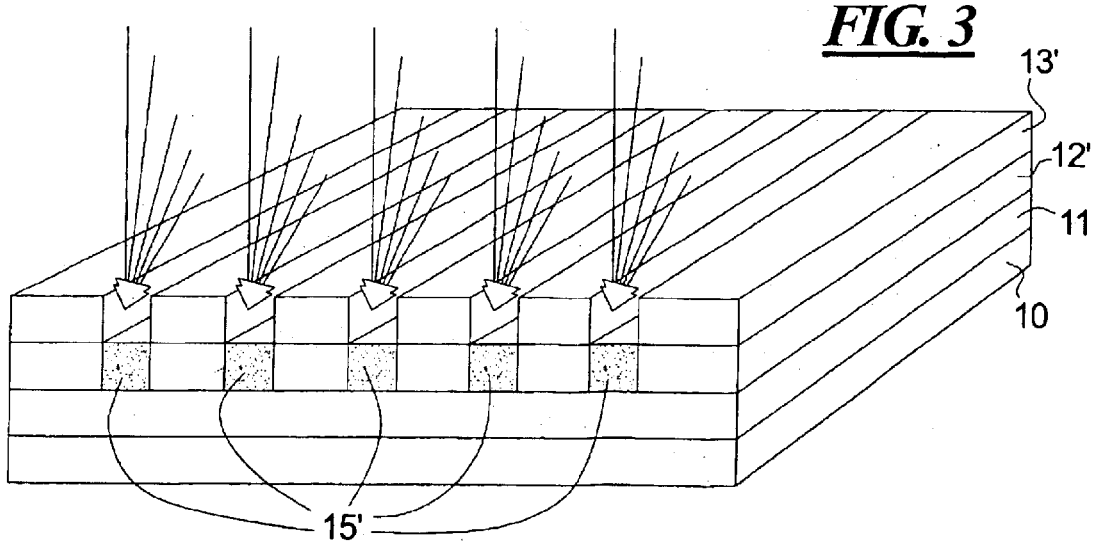
FIG. 3 is a perspective view of the structure shown in FIG. 2 illustrating the implantation of ions through the grooves and into the exposed transverse sections of the guide layer using a plurality of energies and angles.

Turning to FIG. 3, ion implantation at multiple energies and angles is performed to give a uniform cross-section to the impurity distribution in the transverse sections 15' of the guide layer 12. It will also be noted that the implantation can be carried out using a single low energy implant step. A surface grating may be so formed that may be designed for input or output coupling of light. Further, the implant energy and the implant angles may be varied. An annealing step can be carried out before or after removal of the mask layer 13'.

Figure 4:
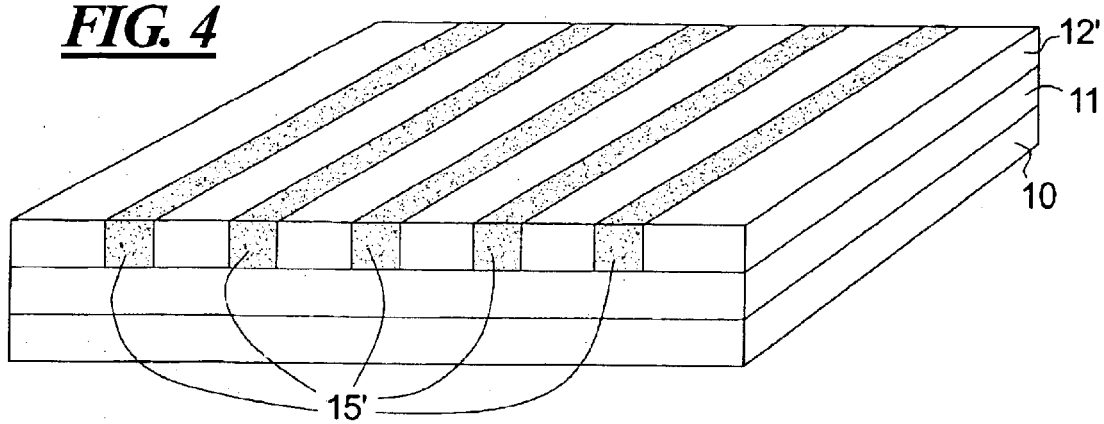
FIG. 4 is a perspective view of the structure shown in FIG. 3 after the mask layer has been removed.
Figure 5:
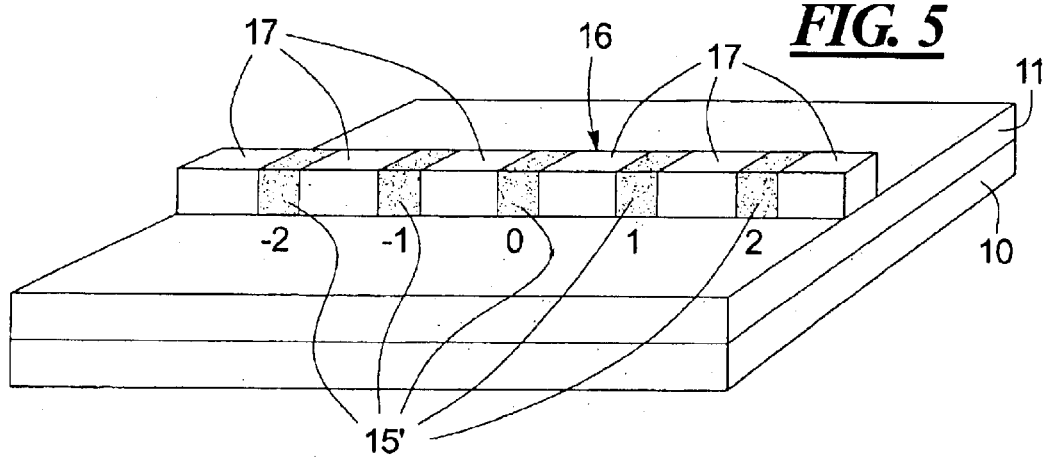
FIG. 5 is a perspective view of the structure of FIG. 4 after the guide layer has been patterned and etched to provide a guide structure.

As shown in FIG. 4, the mask layer 13' is removed by selective wet or dry etching and, as shown in FIG. 5, a waveguide 16 is patterned and etched from the guide material 12'. Again, a lithographic patterning process may be used and wet or dry etching processes may be used. The structure shown in FIG. 5 is then preferably covered with one or more upper cladding layers (not shown) and, possibly, a protective coating.

The type of impurity implanted will depend upon the guide material and the desired optical performance. For semiconductor guides such as Si, InP, Ge, GaAs, InSb, SiGe, etc., donor or acceptor implants such as phosphorous and boron can be used. For dielectric guide materials such as silicon dioxide, silicon nitride, silicon oxynitride, etc., other impurities can be utilized such as oxygen, hydrogen, nitrogen and others. Oxygen and nitrogen implantation into silicon or other semiconductors are also an important combinations.

Figure 6A:
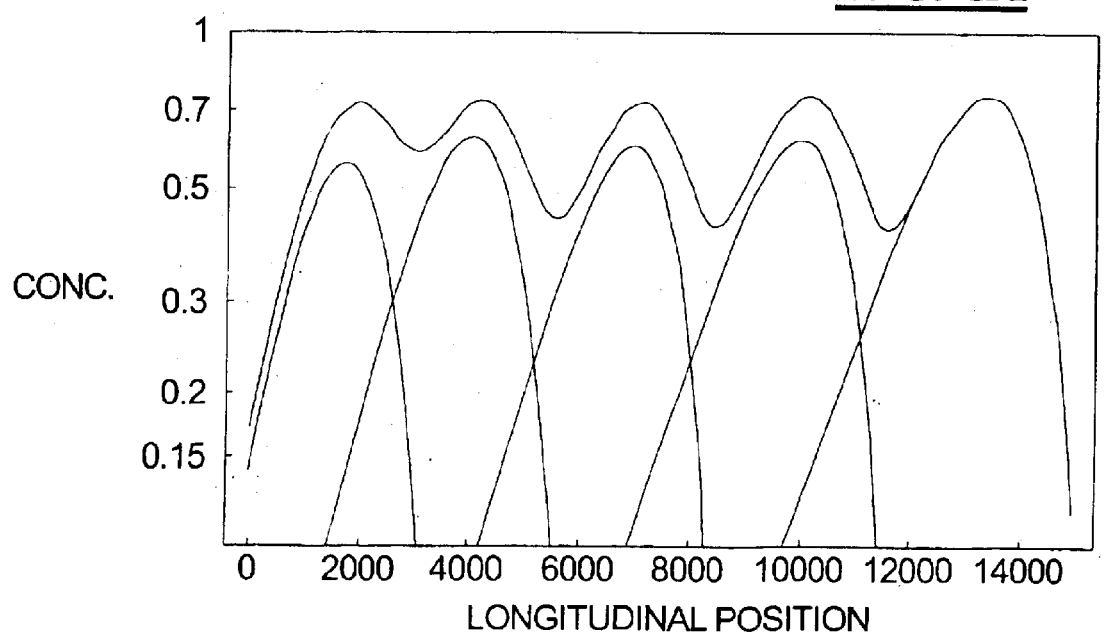
FIG. 6A illustrates, graphically, the implant distribution for boron in a silicon guide layer whereby the concentration of the implanted ions is shown along the y axis and the depth of implantation is shown in the x axis.
Figure 6B:
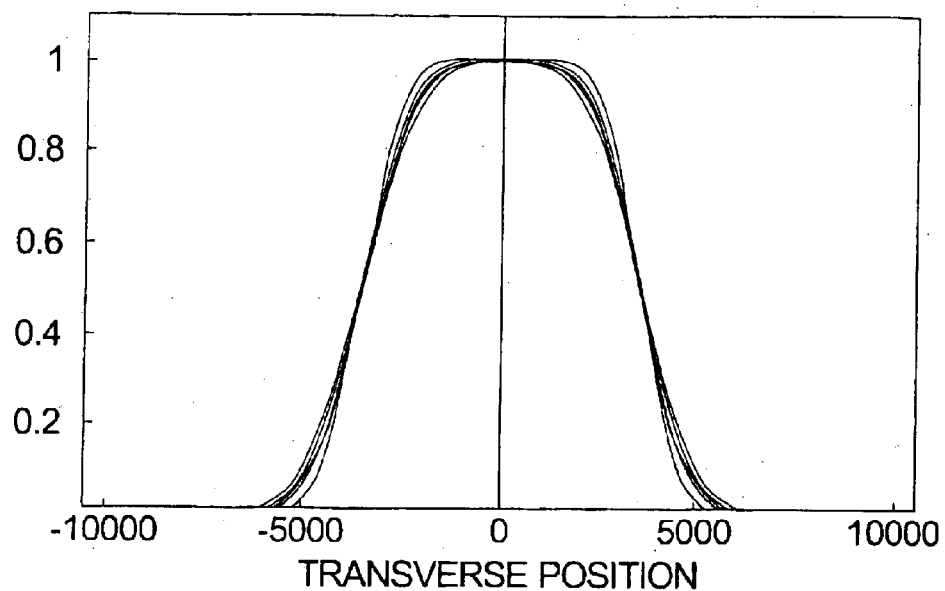
FIG. 6B illustrates, graphically, a cross-sectional distribution of ions for one implanted grating section along the length of the guide.
Figure 7:
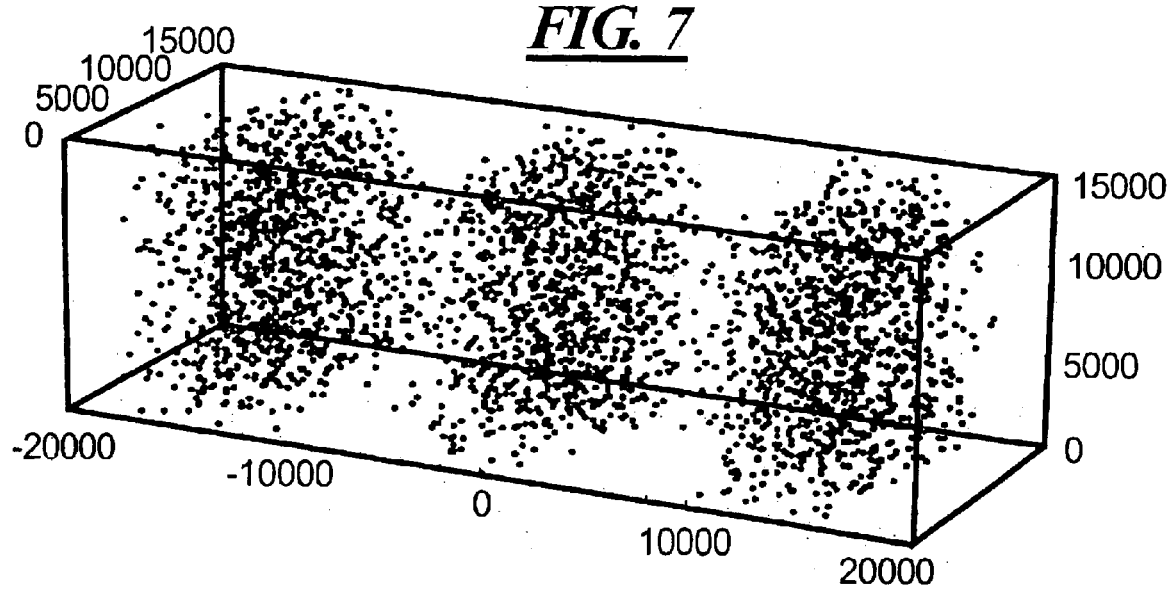
FIG. 7 illustrates, graphically, a Monte Carlo simulation of a boron implant distribution in a silicon guide layer.

FIG. 6A illustrates a calculated four-moment distribution of boron implanted into a silicon waveguide that is 1.5 microns deep and using implant energies of 40, 120, 250, 395 and 565 KeV with relative doses of 1.20, 1.70, 1.75, 2.00 and 2.5. The unit for implanted does can be stated in Coulombs, a unit of charge, which relates to the number of implanted ions. In FIG. 6A, the normalized implant concentrations (e.g., 1.2:2.5 atoms $cm^3$ in the transverse sections 15' of the guide layer 12 are presented along the y-axis. The actual implant concentration will range from $10^{17}$ to $10^{20}$ atoms/$cm^3$ with implant angles of 8, 4, 2, 0 and 0 degrees, respectively. FIG. 6B illustrates the uniform cross-sectional distribution of one implanted section along a longitudinal position of the grating. The Monte Carlo simulation of the distribution illustrated in FIGS. 6A and 6B is shown in FIG. 7. The reader will note that the energies, dose values and implant values used in FIGS. 6A, 6B and 7 are specific to boron in a 1.5 micron silicon waveguide. It will also be noted that if oxygen was used to form silicon dioxide or nitrogen to form silicon nitride, higher energies of implantation would be required.

Thus, an integrated semiconductor waveguide grating and a method of manufacture thereof is shown and described. The grating 16 may also be apodized in at least three different ways.

First, referring to FIG. 5, the transverse sections 17 are illustrated having a uniform length thereby resulting in uniform spacing between the implanted transverse sections 15'. The spacing between the implanted transverse sections 15' may be varied, or the length of each non-implanted section 17 may be varied to create a variable spacing.

Figure 8:
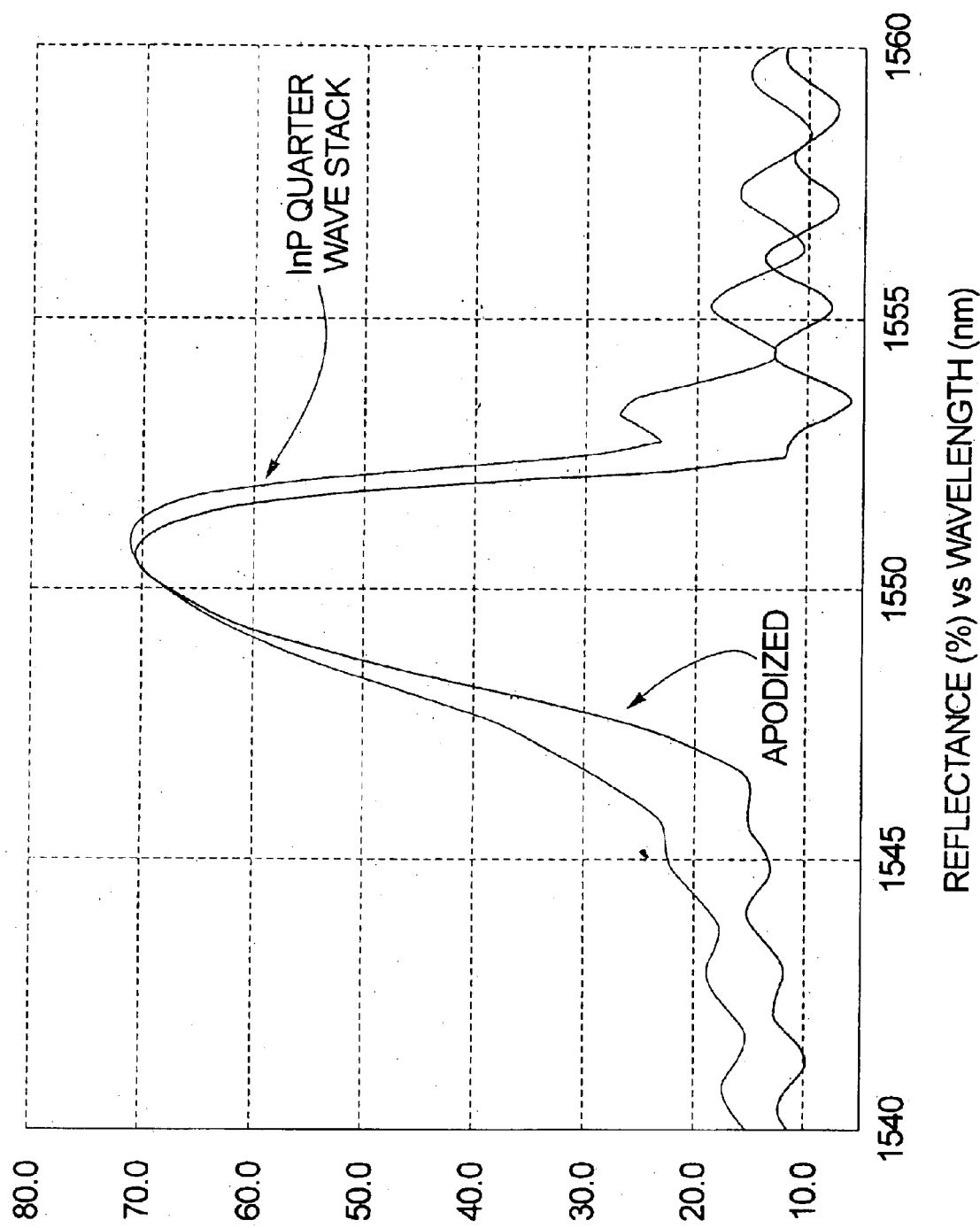
FIG. 8 illustrates, graphically, the reflectance spectra of an n-doped indium phosphorous grating with and without apodization.
Figure 9A:
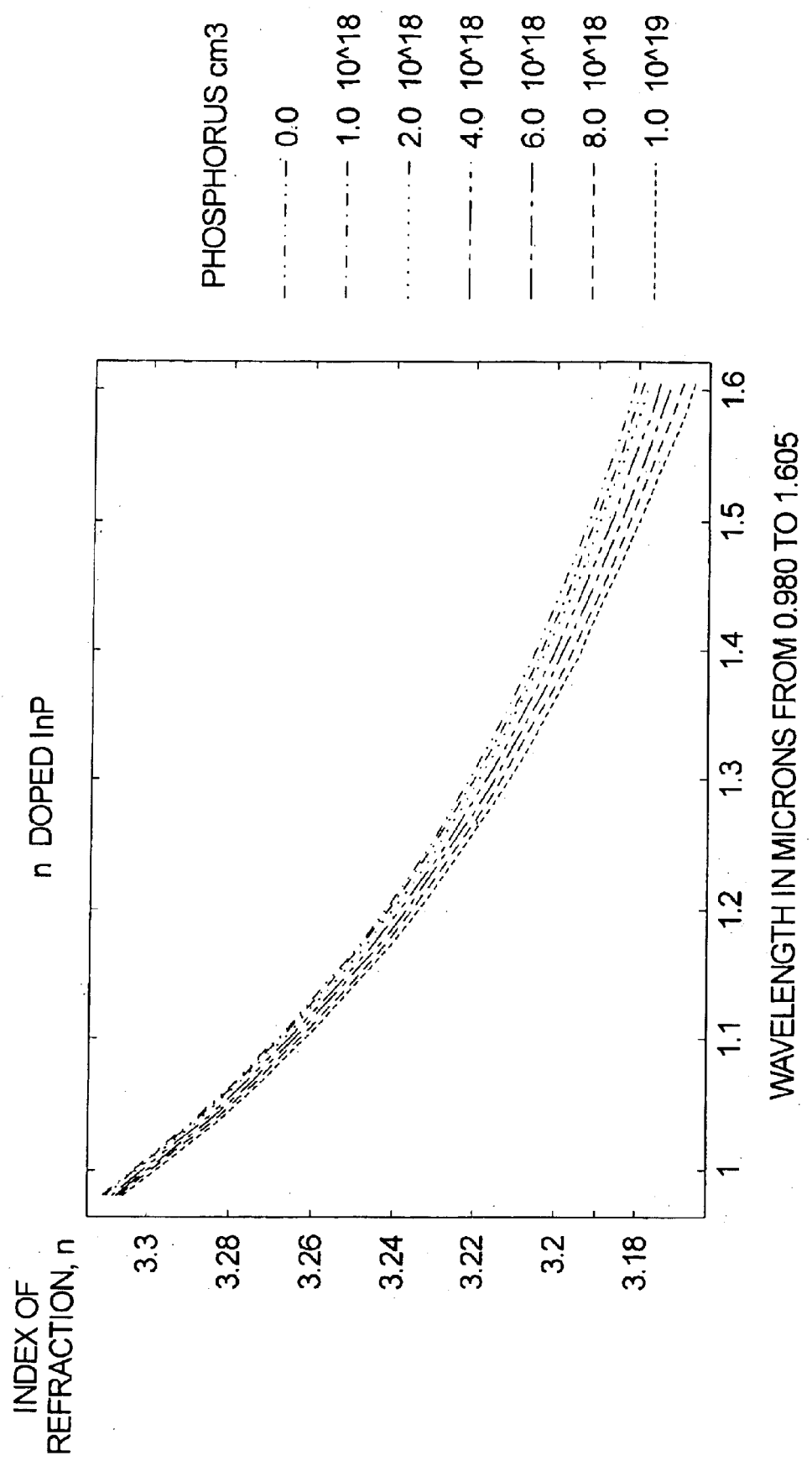
FIG. 9A illustrates, graphically, the index of refraction versus wavelength of the n-doped InP guide layer illustrated in FIG. 8.
Figure 9B:
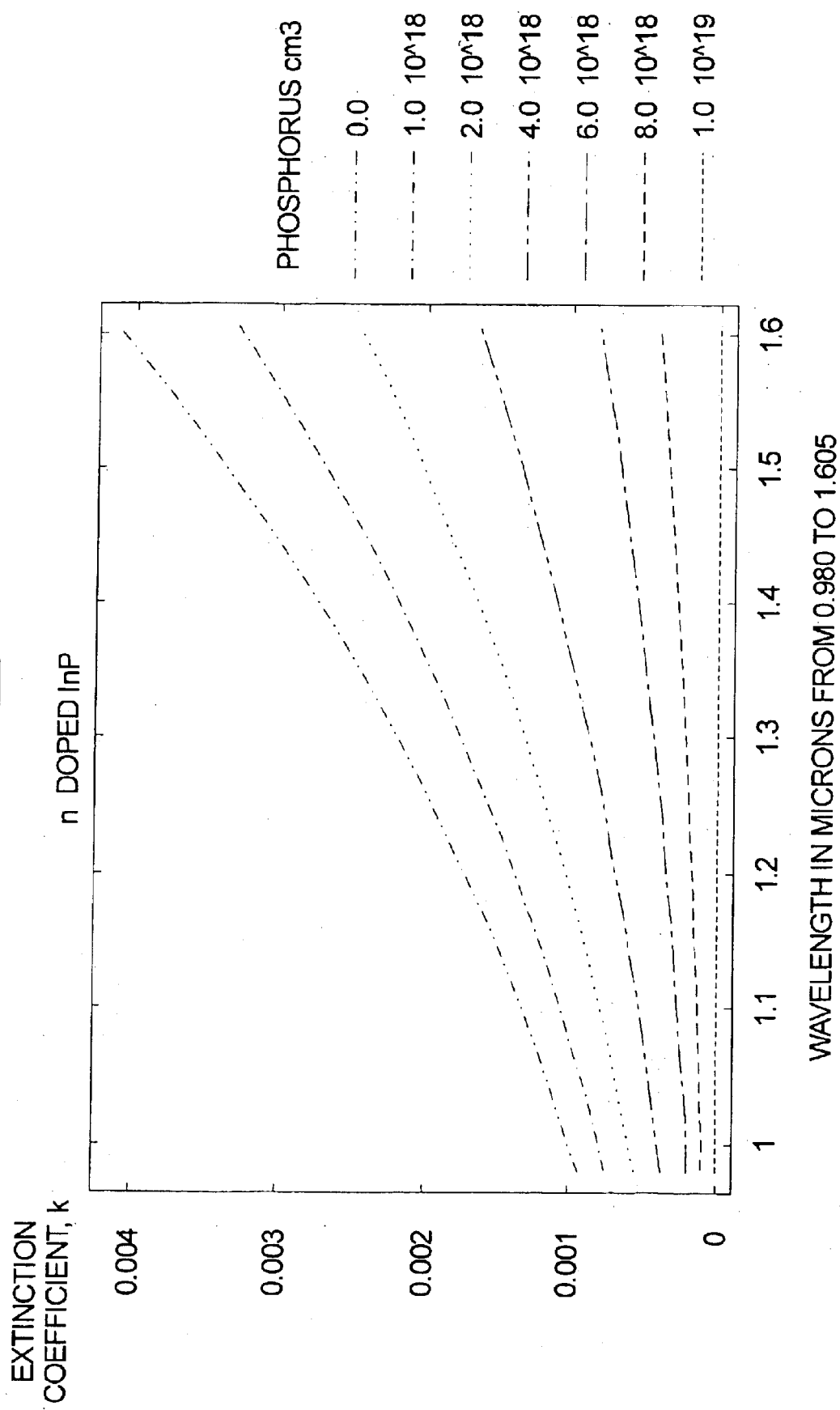
FIG. 9B illustrates, graphically, the extinction coefficient versus wavelength for the n-doped InP guide layer illustrated in FIG. 8.

Another way to apodize the grating 16 is to vary the implant concentration in the transverse sections 15'. Specifically, in FIG. 5, the transverse sections are numbered $0, \pm 1, \pm 2 \ldots \pm N$. These transverse sections can be divided into sections with different implant concentrations. Letting H represent the intrinsic or non-implanted sections 17 and letting $L_{-1}, L^2 \ldots L_N$ represent implanted regions 15' of decreasing concentration, if the length of H and L regions are equal to ¼ wavelength optical thickness, then a standard Bragg reflector can be described by the expression $(HL_{-1})^N$. Using this notation, an apodized grating with a total of N pairs can be described by the equation $(HL_{-3})^L(HL_{-2})^M(HL_{-1})^{N-M-L}(HL_{-2})^M(HL_{-3})^L$. Comparison of these two spectra using an n-doped InP waveguide is shown in FIG. 8 based upon the index of refraction (n) and extinction coefficient (k) data shown in FIGS. 9A, 9B.

Finally, apodization can be achieved by varying the implant angles with respect to a vector that is normal (i.e., perpendicular) to the surface of the substrate 10 or guide layer 12. The result would be a smoothing out of the transitions between the intrinsic or non-implanted and the extrinsic or implanted sections and which tend to suppress harmonics.

Thus, an integrated semiconductor waveguide grating, methods of fabricating integrated semiconductor waveguide gratings and methods of apodizing integrated semiconductor waveguide gratings are disclosed. In the foregoing detailed description, the disclosed structures and methods have been described with reference to exemplary embodiments. It will, however, be evident that various modifications and changes may be made thereto without departing from the broader spirit and scope of this disclosure. The above specification and figures accordingly are to be regarded as illustrative, rather than restrictive. Particular materials selected herein can easily be substituted for other materials that will be apparent to those skilled in the art and would nevertheless remain equivalent embodiments of the invention.

What is claimed is:

1. An integrated semiconductor waveguide grating comprising:
    a substrate,
    a cladding layer disposed on the substrate,
    a guide structure disposed on the cladding layer, the guide structure comprising a plurality of discreet transverse sections implanted with ions disposed between adjacent transverse sections substantially free of implanted ions, the discreet transverse sections implanted with ions extending transversely through the guide structure, and wherein the sections implanted with ions are further characterized as being implanted at a plurality of different energies and at a plurality of different angles.

2. The waveguide grating of claim 1 wherein the guide structure comprises silicon and the ions are selected from the group consisting of boron, nitrogen, oxygen, phosphorous and germanium.

3. The waveguide grating of claim 1 wherein the guide structure comprises silicon and the ions are donor or acceptor impurities.

4. The waveguide grating of claim 1 wherein the transverse sections substantially free of implanted ions have a substantially uniform length thereby creating substantially uniform spacing between the sections implanted with ions.

5. The waveguide grating of claim 1 wherein transverse sections substantially free of implanted ions have differing lengths thereby creating variable spacing between the sections implanted with ions.

6. The waveguide grating of claim 1 wherein the concentration of implanted ions in the discreet transverse sections varies.

7. The waveguide grating of claim 1 wherein the concentration of implanted ions in the discreet transverse sections is substantially uniform.

8. A method of fabricating an integrated semiconductor waveguide grating, the method comprising:
 depositing a cladding layer disposed on a substrate,
 depositing a guide layer on the cladding layer,
 depositing mask layer on the guide layer,
 patterning a plurality of transverse grooves through the mask layer to expose transverse portions of the guide layer,
 implanting ions at a plurality of different energies and at a plurality of different angles through the grooves of the mask layer and into the exposed transverse portions of the guide layer,
 removing the mask layer,
 patterning the guide layer to form the waveguide grating with discreet transverse sections implanted with ions that extend through the grating.

9. The method of claim 8 wherein the guide layer comprises silicon and the ions are selected from the group consisting of boron, nitrogen, oxygen, phosphorous and germanium.

10. The method of claim 8 wherein the guide layer comprises silicon and the ions are donor or acceptor impurities.

11. The method of claim 8 wherein the grooves in the masking layer are spaced substantially uniformly apart.

12. The method of claim 8 wherein the grooves in the masking layer are non-uniformly spaced apart.

13. The method of claim 8 wherein the concentration of ions implanted through the grooves in the mask layer varies.

14. The method of claim 8 wherein the concentration of ions implanted through the grooves in the mask layer is substantially uniform.

15. A method of apodizing an integrated semiconductor waveguide grating, the method comprising:
 depositing a cladding layer disposed on a substrate,
 depositing a guide layer on the cladding layer,
 depositing mask layer on the guide layer,
 patterning a plurality of transverse grooves through the mask layer to expose transverse portions of the guide layer,
 implanting ions at a plurality of different energies and at a plurality of different angles through the grooves of the mask layer and into the exposed transverse portions of the guide layer and at varying concentrations resulting in differing concentrations of implanted ions in the exposed transverse portions of the guide layer,
 removing the mask layer,
 patterning the guide layer to form the waveguide grating.

16. The method of claim 15 wherein the guide layer comprises silicon and the ions are selected from the group consisting of boron, nitrogen, oxygen, phosphorous and germanium.

17. The method of claim 15 wherein the grooves in the masking layer are spaced substantially uniformly apart.

18. The method of claim 15 wherein the grooves in the masking layer are non-uniformly spaced apart.

19. A method of apodizing an integrated semiconductor waveguide grating, the method comprising:
 depositing a cladding layer disposed on a substrate,
 depositing a guide layer on the cladding layer,
 depositing mask layer on the guide layer,
 patterning a plurality of transverse grooves through the mask layer to expose transverse portions of the guide layer,
 implanting ions through the grooves of the mask layer and into the exposed transverse portions of the guide layer at uniform concentrations but at a plurality of different energies and at a plurality of different angles resulting in differing concentrations of implanted ions in the exposed transverse portions of the guide layer,
 removing the mask layer,
 patterning the guide layer to form the waveguide grating with the implanted transverse portions extending transversely through the grating.

20. The method of claim 19 wherein the guide layer comprises silicon and the ions are selected from the group consisting of boron, nitrogen, oxygen, phosphorous and germanium.

21. The method of claim 19 wherein the grooves in the masking layer are spaced substantially uniformly apart.

22. The method of claim 19 wherein the grooves in the masking layer are non-uniformly spaced apart.

* * * * *